United States Patent [19]

Muradov

[11] Patent Number: 5,246,737
[45] Date of Patent: Sep. 21, 1993

[54] METHOD FOR IMMOBILIZING SEMICONDUCTORS AND NOBLE METALS ON SOLID SURFACES

[75] Inventor: Nazim Z. Muradov, Melbourne, Fla.

[73] Assignee: University of Central Florida, Orlando, Fla.

[21] Appl. No.: 843,184

[22] Filed: Feb. 28, 1992

[51] Int. Cl.$^5$ .......................... B05D 3/04; B05D 1/36
[52] U.S. Cl. ................................. 427/307; 427/372.2; 427/404; 427/419.2; 427/553
[58] Field of Search .................. 427/307, 372.2, 430.1, 427/180, 181, 183, 419.7, 553; 204/192.15

[56] References Cited

U.S. PATENT DOCUMENTS 4,861,484 8/1989 Lichtin et al. ...................... 502/518

Primary Examiner—Shrive Beck
Assistant Examiner—David M. Maiorana
Attorney, Agent, or Firm—James H. Beusse

[57] ABSTRACT

A method is provided for immobilizing a semiconductor or noble metal material on a selected support material. In accordance with the method, the support is treated with a first solvent to clean and prepare the surface of the support. A powder slurry including fine particles of the semiconductor in a second solvent is then formed. The resultant slurry is applied to surface of the support. Subsequently, the slurry on the surface of the support is dried at room temperature to remove the second solvent to achieve an intermediate type of bonding between the semiconductor and the support surface.

19 Claims, No Drawings

METHOD FOR IMMOBILIZING SEMICONDUCTORS AND NOBLE METALS ON SOLID SURFACES

This invention relates in general to the immobilization or fixation of various elements and compounds on selected surfaces and, more particularly, to the immobilization of semiconductors and noble metals on solid surfaces.

BACKGROUND OF THE INVENTION

Semiconductor and noble metal catalysts are often employed to promote high efficiency chemical processes including both catalytic and photocatalytic reactions. Before such chemical processes can be efficiently implemented, it is often necessary to immobilize or fixate a selected catalyst on a particular support structure.

Immobilized semiconductors and noble metals have been shown to be effective catalysts for a variety of heterogeneous and photolytic reactions such as photogeneration of hydrogen, photocatalytic oxidation, and detoxification of hazardous wastes. Moreover, immobilization of semiconductors and noble metals is especially useful from the process engineering point of view because it simplifies and facilitates the separation of the catalyst from the reaction medium and reaction products.

Several approaches have been used in the past to immobilize a selected catalyst on various support structures. For example, the most widely used method of immobilizing semiconductors involves soaking or impregnating a selected support surface with an aqueous solution containing a semiconductor suspension. The surface is then dried to achieve immobilization of the semiconductor on the surface. More particularly, Al-Ekabi and Serpone teach the introduction of a suspension of $TiO_2$ particles into a coiled glass support so as to cover the entire internal surface of the glass support. The suspension was then evaporated to dryness under vacuum to immobilize the $TiO_2$ particles on the glass support. (See Al-Ekabi et al., "Kinetic Studies In Heterogeneous Photocatalysis", J. Phys. Chem, vol. 92, pp. 5726-5731 (1988).)

In U.S. Pat. No. 4,861,484, Lichtin et al. teach a similar technique which involves mixing approximately 1 g of $TiO_2$ powder with about 20 ml of water and applying the resulting mixture onto the internal surface of a glass cylinder which served as a reaction cell. The glass cylinder was rotated by hand to evenly coat the inner surface of the cylinder. Air evaporation of water was then conducted to dry the cylinder. Unfortunately, such soaking-drying methods are unlikely to result in sufficient binding between the catalyst and the surface. This is mainly due to weak Van der Waals type interactions between the semiconductor catalyst and the glass surface. This weak interaction eventually leads to loss of the active phase especially when the immobilized structure is subjected to very turbulent flow regimes.

Another immobilization technique is disclosed by Kuczynski and Thomas in J. Phys. Chem, vol. 89, pp. 2720-2722 (1985). That technique involves multiple preparation stages including soaking the support surface in an aqueous solution of an appropriate metal salt and subsequent formation of the semiconductor directly on the support surface by an ion exchange reaction. More specifically, the technique involves the preparation of CdS on porous glass by soaking the clean porous glass surface in $CdCl_2$ solution before drying it under vacuum to remove water, thereby leaving the cadmium salt on the glass. The impregnated glass was then immersed in $Na_2S$ solution to complete the immobilization process.

Still another multiple preparation stage immobilization technique is disclosed by Ueno et al., J. Phys. Chem, vol. 89, pp. 3828-3833 (1985). Ueno et al. teach immobilizing CdS and ZnS on supports such as silica powder, thin films of perfluorocarbon sulfonate ionomers, frosted glass, weighing paper, and a polyamide mesh. In each of these instances, the support was soaked in $Cd(NO_3)_2$ or $Zn(NO_3)_2$ solution and then placed in an $H_2S$ saturated aqueous solution. Unfortunately, this particular approach exhibited some disadvantages. For example, this approach immobilizes some types of semiconductors better than others. This method works well with sulfide type semiconductors but not as well with oxide type semiconductors. The authors also reported that sonication removed ZnS-CdS particles from glass and paper supports. This demonstrates a weakness in the binding action between the semiconductor and these support surfaces. However, CdS immobilized perfluorocarbon sulfonate ionomer films (Nafion films) exhibit excellent binding between the semiconductor and the polymeric support surface due to the ionic bonding between $Cd^{2+}$ and the cation exchange resin. Nafion is a trademark of E. I. du Pont de Nemours & Co., Inc.

Several high temperature methods of immobilization including a pyrolysis stage are also known. For example, Serpone et al. describe impregnation of $TiO_2$ on glass beads by the high temperature thermal decomposition of titanium (IV) alkoxides. (See Solar Energy Materials, Vol. 14, pp. 121-127 (1986).) Augugliaro et al. have also reported a method of preparing alumina supported iron doped $TiO_2$. (See Int. J. Hydrogen Energy, vol. 7, pp. 845-849 (1982).) In that method, alumina was pore volume impregnated by an iron sulfate containing $TiCl_3$ solution. After mixing and stirring, the mixture was slowly heated up to 700° C. and then maintained at this temperature for twenty-four hours. Moreover, Smestad et al. disclose a chemical spray pyrolysis (CSP) method for producing thin film semiconducting iron oxides and iron pyrite. (See Solar Energy Materials, vol. 20, pp 149-165 (1990). In that method, $Fe_3O_4$ and $Fe_2O_3$ films were prepared by CSP of $FeCl_2$ and $FeCl_3$, respectively. The sprayed oxide layers were then deposited on Schott AF45 glass. Pyrite layers were obtained by the reaction of $Fe_2O_3$ or $Fe_3O_4$ films with gaseous sulfur heated to 350° C. for up to two hours. Unfortunately, this method is not generally applicable to all types of semiconductors. For example, this method does not permit immobilization of complex oxide type semiconductors such as $SrTiO_3$ on temperature resistant supports. Moreover, With this CSP technique, it is difficult to control the formation of the specific form of the semiconductor structure on the support surface.

In addition, many vapor deposition (VD) methods are known for immobilizing metals on selected support structures. For example, in Solar Energy Materials, vol. 20, pp 149-165 (1990), Smestad et al. describe the preparation of iron oxide layers by evaporating iron on the support material with subsequent oxidation in an $N_2/O_2$ gas flow at 350° C. The evaporated layers were deposited on a 0.025 mm Kapton (Kapton is a trademark of DuPont) polyimide support structure and AF45 glass. This VD method is limited to semiconductors as the deposited material and is further limited to supports which are stable at high temperatures in a hard vacuum.

None of the immobilization methods described above are universal in that none of these methods provide a reliable way of fixing a wide range of different types of semiconductors (and modifications thereof) and noble metals onto a wide range of organic and inorganic solid support surfaces.

SUMMARY OF THE INVENTION

One object of the present invention is to provide a method of immobilizing semiconductors and noble metals on a wide range of solid surfaces.

Another object of the present invention is to provide a method of immobilizing semiconductors and noble metals on solid surfaces in a manner such that the semiconductors and noble metals substantially retain their photoelectrochemical, catalytic, and other physical properties.

Yet another object of the present invention is to provide a method of immobilizing semiconductors and noble metals on support surfaces whereby the method can be conducted at ambient or room temperatures and pressures.

In accordance with the present invention, a method is provided for immobilizing a selected substance on a surface of a solid support. The method includes the step of treatment of the surface of the support with a first solvent. The method further includes the step of forming a powder slurry including fine particles of the selected substance in a second solvent. The method still further includes the step of applying the slurry to the surface of the support. The method also includes the step of drying the slurry on the surface of the support at room temperature to remove the second solvent to achieve intermediate type of bonding between the selected substance and the surface of the support.

The features of the invention believed to be novel are specifically set forth in the appended claims. However, the invention itself, both as to its structure and method of operation, may best be understood by referring to the following description.

DETAILED DESCRIPTION OF THE INVENTION

The present invention is a method for immobilizing or fixating semiconductors and noble metals on a relatively wide range of support structures or support surfaces. More particularly, the method achieves such immobilization on support surfaces including but not limited to: films, granules, rings, powders, tubes, capillary tubes, coils, glass wool, fabrics, gauze, cotton, paper, and polymeric membranes.

To immobilize a semiconductor on a support made of polymeric material, in step A of the method, a selected polymeric surface of the support is treated with an appropriate solvent as discussed in more detail later. In step B, a fine (less than approximately one micron particle size) semiconductor powder slurry in the same solvent is then applied to the selected polymeric surface. In step C, the solvent is then removed by drying the polymeric surface with room temperature air. As used herein, treating the support surface means applying a selected solvent which not only cleans but causes the outer layer of the surface to swell and be capable of binding fine particles by molecular entanglement, i.e., by wrapping around the fine particles with polymer molecules. Thus, the solvent for the first step is capable of partially or entirely dissolving the support material or other auxiliary material, e.g., silicone polymer, if support is not soluble.

When non-soluble natural or synthetic polymers are employed as the support or other non-soluble materials are used as the support, then the method includes the following step B' which is substituted for step B. In step B', a thin layer of approximately 1 to 100 microns of semiconductor slurry in a solvent containing an appropriate polymer, preferably silicone polymer, is applied to the already treated support surface.

When silica-containing materials such as glass, quartz, and ceramics, for example, are used as the support, and when it is necessary to avoid any organic material in the support then after step B' and step C, the treated support is subjected to a step D wherein the treated support is heated in an oven to a temperature within the range of approximately 400° C. to approximately 600° C. for a time period of approximately one hour to approximately four hours. After completion of the above outlined steps, the semiconductor is observed to be immobilized on the support structure.

Several examples of immobilization of selected substances on selected support structures in accordance with the method of the present invention are now discussed. For example, in a first embodiment of the method of the invention, to immobilize the semiconductor CdS on a polymer such as Plexiglas, the surface of a Plexiglas sample is treated with a solvent formed by a mixture of methylene chloride ($CH_2Cl_2$) and acetone, such chemicals being mixed in a 2:1 ratio, respectively. (Plexiglas is a trademark of Rohm & Haas Co.) A slurry of 1.0 g of CdS in 50 ml of the same solvent is applied uniformly by a soft brush onto a selected surface of the Plexiglas sample. The selected surface of the Plexiglas sample is then dried in air for approximately one hour at ambient or room temperature and pressure to remove the solvent. Loose CdS particles are removed from the selected surface of the Plexiglas sample by washing with water. The Plexiglas sample is then dried for approximately five to ten hours at room temperature and pressure. When the above steps are carried out, the CdS semiconductor catalyst is immobilized on the surface of the Plexiglas support structure and is found to exhibit a catalyst loading density of approximately 0.5 mg/$cm^2$.

For purposes of this document, ambient or room temperatures are understood to be those temperatures with the range of approximately 20 ° C. to approximately 30 ° C. Ambient or room pressures are taken to be those pressures within the range of approximately 14.0 psi to approximately 15.0 psi. It is also understood that the method may be practiced at temperatures and pressures ranges greater or less than ambient or room temperature and pressure, however, advantageously the method need not be practiced within such elevated or depressed ranges.

To immobilize $TiO_2$ on a vinyl copolymer such as Tygon tubing (Tygon is a trademark of U.S. Stoneware Co.), a Tygon tubing sample is filled with tetrahydrofurane (THF) solvent for approximately ten minutes. The solvent is then drained out and the tubing is filled with a slurry made of 0.1 g of $TiO_2$ (Degussa P-25) and 25 ml of a mixture of THF and acetone exhibiting a 3:1 ratio by volume. (P-25 is a trademark of Degussa Corporation.) The tubing is rotated by hand for approximately five minutes to achieve uniform loading. The slurry is then drained from the tubing. The above described steps are repeated two times and then the tubing is air dried at ambient or room temperature and pressure for approximately five hours. The tubing is then washed and dried in ambient air overnight (for approximately five to ten hours).

To immobilize $TiO_2$ on silicone tubing, the silicone tubing is filled with methylene chloride solvent. The tubing with the solvent therein is permitted to stand for approximately six hours. As the solvent evaporates and is absorbed by the silicone tubing, more solvent is introduced to the tubing to compensate for these solvent losses. The solvent is then drained from the tubing. The tubing is then filled with a slurry of 0.1 g $TiO_2$ (Degussa grade P-25) in a solvent formed from a 3:1 by volume mixture of $CH_2Cl_2$ and acetone. The tubing is rotated for approximately twenty minutes to achieve a uniform coating on the inner wall of the tubing. The solvent is then drained out. The above described steps are repeated two times and then the tubing is dried in an air stream for approximately ten hours. The tubing is then washed and permitted to dry overnight (five to ten hours).

The method of the present invention may also be employed to immobilize a semiconductor catalyst such as $TiO_2$ on a fabric. More specifically, 5 g of silicone, such as silicone rings for example, are exposed to 50 ml of methylene chloride solvent solution in a 200 ml flask for approximately twenty-four hours at room temperature. Solvent containing a relatively small amount of silicone polymer (approximately 0.2 g) is drained out of the flask and is added to 1 g of $TiO_2$ (Degussa P-25) to form a slurry. The slurry is applied onto a selected surface of a 30 cm by 30 cm piece of cotton fabric by using a soft brush as an applicator. The fabric is then dried at room temperature and pressure for approximately six hours. The fabric is then washed to remove loose $TiO_2$ particles. The washed fabric is then dried overnight (five to ten hours). After implementing the above described steps of the immobilization method of the present invention, the $TiO_2$ catalyst was found to be immobilized on the fabric surface. The catalyst loading density on the fabric was found to be approximately 0.45 $mg/cm^3$ in this instance.

The method of the present invention can also be employed to immobilize $TiO_2$ on a glass support such as a Pyrex, for example. (Pyrex is a trademark of Corning Glass Corp.) In accordance with this embodiment of the method, a slurry of 1 g of $TiO_2$ in methylene chloride ($CH_2Cl_2$) containing silicone polymer is mixed as in the immediately prior example. More specifically, 5 g of silicone, such as silicone rings for example, are exposed to 50 ml of methylene chloride solvent solution in a 200 ml flask for approximately twenty-four hours at room temperature. Solvent containing a relatively small amount of silicone polymer (approximately 0.2 g) is drained out of the flask and is added to 1 g of $TiO_2$ (Degussa P-25) to form the slurry. Once the slurry is formed in this manner, 1 ml of acetic acid is added to the slurry. The slurry is then thoroughly intermixed and a portion thereof is applied with a soft brush onto the surface of the glass support. The support surface on which the slurry was deposited is then dried with air at room temperature and pressure for approximately three hours. The glass support is then placed in an oven and heated to a temperature of approximately 200° C. for approximately one hour and then to a temperature of approximately 500° C. for approximately three hours. When the method was implemented in the above described manner, a $TiO_2$ catalyst loading density of 0.35 $mg/cm^2$ was 10 achieved.

The method of the present invention can also be used to immobilize platinum (Pt) on a polymeric support such as a Plexiglas support, for example. For purposes of this example, it is assumed that a semiconductor layer has already been deposited on the surface of the support in accordance with the above teachings (i.e., a CdS layer on a Plexiglas support). It is also assumed that it is now desired to immobilize a noble metal layer (Pt layer) on that already deposited semiconductor layer. The surface of the Plexiglas sample with the semiconductor layer thereon is sputtered with a 50 ml solution of well mixed aqueous $H_2PtCl_6$ (0.1% by weight) and propanol-2 in a 1:2 ratio by volume. The sputtered surface is then irradiated for approximately twenty minutes by a xenon arc lamp or for approximately forty minutes with natural sunlight. The surface of Plexiglas was then washed with water and dried for 10 hours. It was found that in this embodiment of the immobilization method of the present invention that the catalyst loading density was approximately 0.02 $mg/cm^2$. In this alternative embodiment of the method of the invention, ultra fine (less than 0.1 micron diameter) particles of noble metals are deposited on the solid surface (for example, a polymeric surface) by exposing an appropriate semiconductor coated support surface to ultraviolet or solar radiation in the presence of propanol-2 and a noble metal salt solution to achieve immobilization.

The method of the present invention has many useful applications in which a relatively wide range of semiconductors and noble metals may be immobilized on different types of supports surfaces. For example, much interest has recently been generated in photoelectrochemical (PEC) reactions using semiconductor suspensions and colloids. The main feature of PEC systems is their ability to generate electron-hole pairs on the surface of a semiconductor to promote redox reactions when exposed to light. A noteworthy problem in such PEC systems is the separation of semiconductor particles from the electrolyte solution and photoreaction products. The method of the present invention provides a way of immobilizing semiconductors/catalysts onto any solid surface thus alleviating the aforementioned catalyst-electrolyte separation problem. The disclosed immobilization method permits immobilization of a photocatalyst directly onto a photoreactor surface so as to considerable simplify photoreactor design and reduce operational cost.

The present invention also has applications in heterogenous catalysis reactions. In heterogenous catalysis, the active material is often a metal (an oxide or sulfide, typically) which exhibits a very small particle size. Those skilled in the art appreciate that, by reducing the particle size, large reaction surface areas and correspondingly higher chemical activity per unit mass of catalyst are made possible. Unfortunately, such a highly dispersed state of the catalyst results in an unstable situation. Immobilization of the catalyst can be used to mitigate this problem. More particularly, the present invention provides a method for immobilizing the active phase, i.e., semiconductors and noble metals, on many different support surfaces without a loss in the catalytic activity of the immobilized substances. This desirably permits a reduction in the amount of active phase employed in a particular catalytic reaction.

Numerous other applications for the immobilization method of the present invention are also possible. For example, solar energy conversion applications are possible wherein the method is used to directly immobilize a semiconductor material onto surfaces such as vehicles, buildings, and virtually any other surface where the semiconductor is to be employed for energy conversion purposes.

Also, the method can be used to immobilize semiconductors and noble metals onto the surfaces of membranes which are capable of separating reaction products of a particular process such as the photodecomposition of water, for example. In that instance, membrane supported immobilized photocatalysts would permit hydrogen separation, in situ, in the course of the reaction.

Additionally, the method can be used in hazardous waste management to immobilize active photocatalysts on inexpensive support materials for large scale detoxification processes using solar or ultraviolet radiation. Applications are also contemplated wherein the method is used in the recovery of noble and heavy metals from waste water. It is known that n-type semiconductors such as $TiO_2$, $ZnO$, $CdS$, and $WO_3$ can be used to drive the photochemical reduction of dissolved metals with resultant deposition of the product on the photocatalyst. Unfortunately, a number of technical difficulties arise from the use of suspensions which have hindered the large scale applications of such processes. However, the immobilization method of the present invention can be employed at low cost to immobilize the above semiconductors and others on inexpensive supports or virtually any size, type or configuration. In this manner, large scale, solar driven recovery of noble metals (for example, Pt, Pd, Ag, Au, Rh, and Ir) and heavy hazardous metals (for example, Hg and Cu) can be carried out, in situ, in aqueous solutions.

From a mechanistic perspective, the immobilization method of the present invention achieves an "intermediate" or "medium" type of bonding of the semiconductor or noble metal particles to the support surface. This type of bonding is in contrast to the "soft" type of bonding achieved by prior soaking and drying techniques or the "strong" type of bonding of a ionic bonding character typified by other prior bonding techniques. Unfortunately, such "soft" type bonding techniques tend to result in an immobilized layer with relatively low adherence properties with respect to the support. Also unfortunately, such "strong" types of bonding can undesirably alter the photoelectrochemical and other properties of the semiconductor or noble metal. The immobilization method of the present invention advantageously avoids the above pitfalls of "soft" and "strong" bonding while still providing a high quality bond between the semiconductor or noble metal and the support surface.

It is believed that the desirable "intermediate" type of bonding achieved by the present invention is a result of a combination of different types of interactions which occur between semiconductors/noble metals and solid support surface, for example, molecular entanglement, hydrogen bonding, acid-base interaction, etc.

The foregoing describes a method for immobilizing semiconductors and noble metals on a wide variety of surfaces including films, granules, powders, tubes, capillary tubes, coils, glass wool, fabrics, gauze, cotton, and paper, for example. When immobilized in accordance with the present invention, the immobilized semiconductors and noble metals substantially retain their photoelectrochemical, catalytic, and other physical properties. Advantageously, the method can be practiced at ambient or room temperatures and pressures. Also advantageously, the method of the present invention employs low cost reagents and solvents. Moreover, the present invention is useful to immobilize semiconductors on polymeric membranes allowing in-situ separation of the semiconductor/noble metal catalyst from reaction products in selected chemical reactions.

The following is a description of several examples used in verifying the invention.

EXAMPLE 1

Immobilization of CdS on Plexiglas TM

The surface of a piece of Plexiglas TM sample (30×30 cm, and 6 mm thick) was treated with methylene chloride ($CH_2Cl_2$) and acetone mixture (2:1 ratio by volume). The slurry of 1.0 g of CdS in 50 ml of the same solvent was applied uniformly by soft brush onto the surface of plexiglas TM. Then the surface of plexiglas TM was dried for 1 hr with air at room temperature to remove solvent. Loose CdS particles were removed from the surface by washing with copious amounts of water. Sample was then dried overnight at room temperature. Catalyst loading density was approximately 0.5 mg/cm$^2$.

EXAMPLE 2

Immobilization of $TiO_2$ inside Tygon TM tubing

Sample of tygon tubing (I.D.=0.48 cm, O.D.=0.64 cm, length=40.0 cm) was filled with tetrahydrofurane (THF) for 10 min. Then the solvent has been drained out and the tubing was filled with the slurry made of 0.1 g of $TiO_2$ (Degussa P-25) and 25 ml of mixture THF-acetone (3:1 by vol). Tubing was rotated with hands for 5 min. (to achieve uniform loading) and then the slurry was drained out. This procedure was repeated two times more and then tubing was dried by air for 5 h. Tubing was washed with water and dried overnight.

EXAMPLE 3

Immobilization of $TiO_2$ inside of silicone tubing

A piece of silicone tubing (4.8 mm i.d., 9.6 mm o.d., 40.0 cm long) was filled with methylene chloride and left to stand for 6 hrs (as the solvent was evaporated and absorbed by Tygon TM, more solvent was introduced into the tube). After the solvent has been drained out, the tube was filled with a slurry of 0.1 g $TiO_2$ (Degussa TM grade P-25) in 30 ml of mixed solvent $CH_2Cl_2$-acetone (3:1 by volume). Tube was reeled around for some 20 minutes to allow a uniform coating of the tube wall before draining solvent out. The procedure was repeated 2 more times before drying the tube by air stream for 10 hours. Tubing was finally washed with water and dried over night.

EXAMPLE 4

Immobilization of $TiO_2$ on fabric 5 g of silicone rings (cut from a piece of silicon tubing) were exposed to 50 ml of methylene chloride solution in a 200 ml flask for 24 hrs at room temperature. Solvent containing a small amount of silicone polymer (about 0.2 g) was drained out the flask and added to 1 g of $TiO_2$ (Degussa TM P-25) to form slurry. The slurry was applied onto the surface of a 30 cm by 30 cm piece of cotton fabric with soft brush. Fabric was dried at room temperature for 6 hrs, then washed with water to remove loose TiO$_2$ particles and dried overnight. The catalyst loading density was measured to be approximately 0.45 mg cm$^2$.

EXAMPLE 5

Immobilization of TiO$_2$ on glass

To the slurry of 1 g TiO$_2$ (Degussa TM P-25) in methylene chloride (CH$_2$Cl$_2$) containing silicone polymer (Example 4), 1 ml of acetic acid was added. The slurry was intimately intermixed and part of it was applied onto the surface of a Pyrex TM Petri dish (95 mm.o.d.) using a soft brush. The surface was dried with air at room temperature for 3 hrs, then placed into the oven and heated to 200° C. and then 500° C. for 1 and 3 hrs, respectively. The loading density 0.35 mg/cm$^2$ was measured for the catalyst.

EXAMPLE 6

Immobilization of Pt on Plexiglas TM

A piece of plexiglas TM supported CdS (Example 1) was sputtered with 50 ml solution of well mixed aqueous H$_2$PtCl$_6$ (0.1% by weight) and Propanol-2, in 1:2 ratio (by volume) and then irradiated for 20 minutes by a xenon arc lamp (or for 40 min. by natural sunlight). The surface of the plexiglas TM was then washed with water and dried overnight. The catalyst loading density was approximately 0.02 mg/cm$^2$.

In addition, the surface of the CdS and platinum immobilized polypropylene sample was examined by x-ray photoelectron spectroscopy and scanning electron microscopy. It was observed that ultra-fine (colloidal size) particles of Pt were deposited onto the polypropylene supported CdS surface.

Table 1, below, list examples 7-64 for the immobilization of various semiconductors and noble metals on different types of supports. Table 2 illustrates examples of photocatalytic and catalytic reactions using immobilized semiconductors and noble metals.

TABLE 1

Immobilization of Semiconductors on Solid Supports.

| Example 1 | Semiconductor 2 | Noble Metal 3 | Support 4 | Configuration 5 | Solvent 6 | Procedure 7 |
|---|---|---|---|---|---|---|
| 7 | TiO$_2$(F) | Pt | Plexiglas TM | plate | MC,Ac | A,F |
| 8 | TiO$_2$(F) | Ag | Plexiglas TM | plate | MC,Ac | A,F |
| 9 | TiO$_2$(F) | | Ultrason TM | film | THF | A |
| 10 | TiO$_2$(F) | | Polyetherimide | film | MC | A |
| 11 | TiO$_2$(F) | Pt | Tygon TM | tubing | THF | B,F |
| 12 | TiO$_2$(D) | Pt | Polycarbonate | film | MC | A,F |
| 13 | TiO$_2$(D) | Pt | Silicon Polymer | tubing | MC | C,F |
| 14 | TiO$_2$(D) | Pt | Silicon Polymer | rings | MC | C,F |
| 15 | TiO$_2$(F) | | Rayon TM | mesh | MC | A |
| 16 | TiO$_2$(D) | Pt | Rubber | film | Xylene | C,F |
| 17 | TiO$_2$(D) | Pt | Polyethylene | film | MC/SP | D,F |
| 18 | TiO$_2$(D) | Pt—Ag | Polypropylene | film | MC/SP | D,F |
| 19 | TiO$_2$(D) | Pt | Fabric | | MC/SP | D,F |
| 20 | TiO$_2$(F) | Pt | Fabric | | MC/Pl. | D,F |
| 21 | TiO$_2$(F) | Pt | Fabric | | MC/P_ | D,F |
| 22 | TiO$_2$(D) | | Gauze | | MC/SP | D |
| 23 | TiO$_2$(F) | | Paper | | MC/SP | D |
| 24 | TiO$_2$(D) | | Cotton | | MC/SP | D |
| 25 | TiO$_2$(D) | Pt | Wood | plate | MC/SP | D,F |
| 26 | TiO$_2$(D) | Pt | Glass (Pyrex) | plate | MC/SP | D,F |
| 27 | TiO$_2$(D) | Pt | Glass (Pyrex) | tubing | MC/SP | E,F |
| 28 | TiO$_2$(D) | | Glass (Pyrex) | beads | MC/SP | E |
| 29 | TiO$_2$(D) | | Glass (Window) | plate | MC/SP | E |
| 30 | TiO$_2$(D) | Pt | Glass wool | | MC/SP | E,F |
| 31 | TiO$_2$(D) | Pt | Quartz | tubing | MC/SP | E,F |
| 32 | TiO$_2$(D) | Pt | Porcelain | plate | MC/SP | D,F |
| 33 | TiO$_2$(D) | | Porcelain | plate | MC/SP | E,F |
| 34 | TiO$_2$(D) | | Silicagele | beads | MC/SP | E |
| 35 | TiO$_2$(D) | | Zeolite | beads | MC/SP | E |
| 36 | TiO$_2$(D) | | Stone | | MC/SP | E |
| 37 | TiO$_2$(D) | | Aluminum | foil | MC/SP | D |
| 38 | TiO$_2$(D) | | Copper | foil | MC/SP | D |
| 39 | CdS | Pt | Tygon TM | tubing | THF | B,F |
| 40 | CdS | Pt | Polyethylene | film | MC/SP | D,F |
| 41 | CdS | Pt—Ag | Polypropylene | film | MC/SP | D,F |
| 42 | CdS—Ag$_2$S | Pt | Polypropylene | film | MC/SP | D,F |
| 43 | CdS | Pt | Fabric | | MC/SP | D,F |
| 44 | CdS | Ag | Fabric | | MC/Pl. | D,F |
| 45 | ZnO | Pt | Plexiglas TM | plate | MC,Ac | A,F |
| 46 | ZnO | | Rayon TM | mesh | MC | A |
| 47 | ZnO | Ag | Polypropylene | film | MC/SP | D,F |
| 48 | ZnO | | Fabric | | MC/Sp | D |
| 49 | ZnO | | Gauze | | MC/Pl. | D |
| 50 | ZnO | | Paper | | MC/SP | D . |
| 51 | ZnO | | Glass (Pyrex) | tubing | MC/SP | E |
| 52 | SrTiO$_3$ | Pt | Plexiglas TM | plate | MC,Ac | A,F |
| 53 | SrTiO$_3$ | | Polypropylene | film | MC,SP | D |
| 54 | SrTiO$_3$ | | Glass (Pyrex) | tubing | MC,SP | E |
| 55 | Fe$_2$O$_3$ | | Plexiglas TM | plate | MC,Ac | A |
| 56 | Fe$_2$O$_3$ | | Tygon TM | tubing | THF | B |

TABLE 1-continued

Immobilization of Semiconductors on Solid Supports.

| Example 1 | Semiconductor 2 | Noble Metal 3 | Support 4 | Configuration 5 | Solvent 6 | Procedure 7 |
|---|---|---|---|---|---|---|
| 57 | $Fe_2O_3$ | | Polypropylene | film | MC,SP | D |
| 58 | $Fe_2O_3$ | | Fabric | | MC,SP | D |
| 59 | $MoO_3$ | | Plexiglas TM | plate | MC,Ac | A |
| 60 | $MoO_3$ | | Polypropylene | film | MC,Sp | D |
| 61 | $WO_3$ | Pt | Plexiglas TM | plate | MC,Ac | A |
| 62 | $WO_3$ | | Polypropylene | film | MC,SP | D |
| 63 | PbO | | Plexiglas TM | plate | MC,Ac | A |
| 64 | PbO | | Polypropylene | film | MC,SP | D |

Notes:
$TiO_2$(F)—$TiO_2$ from Fisher Scientific; $TiO_2$(D)—$TiO_2$ Degussa P-25 MC - Methylene Chloride, Ac - Acetone, THF - Tetrahydrofuran, MC/SP - Methylene Chloride, containing Silicone Polymer, MC/Pl. - Methelene Chloride, containing Plexiglas TM, MC/P - Methylene Chloride, containing Polycarbonate.
Procedures A, B, C, D, E, F - procedures of immobilization described in examples 1, 2, 3, 4, 5 and 6, respectively.
For immobilization of Silver on polymer and other solid surfaces 0.1M of $AgNO_3$ was used. For simultaneous immobilization of Pt and Ag the mixture of 0.1M solutions of $H_2PtCl_6$ and $AgNo_3$ was used.
A small amount of Acetic Acid (up to 5% by volume) was added to the solvent for uniform immobilization of $TiO_2$ on silica containing supports (glass, quartz, glass wool, silicagel, porcelain and others).

TABLE 2

Photocatalytic and Catalytic Reactions Using Immobilized Semiconductors and Noble Metals

| No | Semiconductor | Noble Metal | Support | Reaction |
|---|---|---|---|---|
| 1 | CdS | Pt | Plexiglas TM | Photocatalytic generation of $H_2$ |
| 2 | CdS | Pt | Polypropylene | Photocatalytic generation of $H_2$ with simultaneous separtion of $H_2$ through polymer support |
| 3 | CdS—$Ag_2S$ | Pt | Polypropylene | Photocatalytic generation of $H_2$ |
| 4 | $TiO_2$ | Pt | Polypropylene | Photocatalytic generation of $H_2$ |
| 5 | $TiO_2$ | | Plexiglas TM | Photodeposition of Pt, Ag Photooxidation of dye |
| 6 | $TiO_2$ | | Tygon TM tubing | Photodeposition of Pt, Ag, Hg |
| 7 | $TiO_2$ | | Fabric | Photooxidation of dye |
| 8 | $TiO_2$ | | Glass | Photodecomposition of organic compounds in liquid and gaseous phase |
| 9 | $TiO_2$ | Pt | Porcelain | Photodecomposition of organic compounds, photogeneration of hydrogen, catalytic decomposition of $H_2O_2$ |
| 10 | $TiO_2$ | Pt | Rubber | Catalytic decomposition of $H_2O_2$ |
| 11 | ZnO | | Glass | Photodecomposition of organic compounds |

While only certain preferred features of the invention have been described herein, many modifications and changes will occur to those skilled in the art. It is, therefore, to be understood that the present claims are intended to cover all such modifications and changes which fall within the true spirit of the invention.

What is claimed is:

1. A method of immobilizing a selected substance on a surface of a solid support comprising the steps of:

treating said surface of said support with a first solvent, said first solvent being capable of dissolving said surface of said support;

forming a powder slurry including fine particles of said selected substance in a second solvent;

applying said slurry to said surface of said support, and drying said slurry on said surface of said support at room temperature to remove said second solvent to achieve bonding between said selected substances and said surface of said support.

2. A method of immobilizing a selected substance on a surface of a polymeric support, said support including polymeric chains of known length, said method comprising the steps of:

treating said surface of said support with a first solvent, said first solvent being a solvent for said substrate;

forming a powder slurry including fine particles of a selected substance in a second solvent, said particles exhibiting a size which is approximately the same as the length of said polymeric chains of said support;

applying said slurry to said surface of said support, and drying said slurry on said surface of said support at room temperature to remove said second solvent to achieve bonding between said selected substances and said surface of said support.

3. The method of claim 2 wherein said selected substance comprises fine particles exhibiting a diameter of less than approximately 1 micron.

4. The method of claim 2 wherein said selected substance comprises semiconductor particles.

5. The method of claim 2 wherein said second solvent employed in said forming a powder slurry step is the same as the first solvent employed in said treating said surface step.

6. The method of claim 2 wherein said first solvent employed in said treating step is capable of dissolving said surface of said support.

7. A method of immobilizing a selected substance on a surface of a solid non-soluble support comprising the steps of:

cleaning said surface of said support with a first cleaning solvent;

forming a powder slurry including fine particles of said selected substance in a second solvent, said second solvent being a solvent which contains a polymer;

applying said slurry to said surface of said support, and drying said slurry on said surface of said support at room temperature to remove said second solvent to achieve bonding between said selected substance and said surface of said support.

8. The method of claim 7 wherein the second solvent employed in said forming a powder slurry step comprises a solvent containing a silicone-polymer.

9. The method of claim 7 wherein in said forming a powder slurry step said selected substance comprises fine particles exhibiting a diameter of less than approximately 1 micron.

10. The method of claim 7 wherein in said forming a powder slurry step said selected substance comprises semiconductor particles.

11. The method of claim 7 wherein said second solvent employed in said forming a powder slurry step is the same as the first solvent employed in said cleaning said surface step.

12. A method of immobilizing a selected substance on a surface of a solid silica-containing support comprising the steps of:
   cleaning said surface of said support with a first cleaning solvent;
   forming a powder slurry including fine particles of said selected substance in a second solvent, said second solvent being a solvent which contains a polymer;
   applying said slurry to said surface of said support;
   drying said slurry on said surface of said support at room temperature to facilitate removal of said second solvent; and
   heating said support at elevated temperatures for a period of time sufficiently long to remove said second solvent from said support and to achieve bonding between said selected substance and said surface of said support.

13. The method of claim 12 wherein in said heating said support step said elevated temperature is within the range of approximately 400° C. to approximately 600° C.

14. The method of claim 12 wherein in said heating said support step said time is within the range of approximately one to approximately four hours.

15. The method of claim 12 wherein the second solvent employed in said forming a powder slurry step comprises a solvent containing a silicone-polymer.

16. The method of claim 12 wherein in said forming a powder slurry step said selected substance comprises fine particles exhibiting a diameter of less than approximately 1 microns.

17. The method of claim 12 wherein in said forming a powder slurry step said selected substance comprises semiconductor particles.

18. The method of claim 12 wherein said second solvent employed in said forming a powder slurry step is the same as the first solvent employed in said cleaning said surface step.

19. A method of immobilizing a noble metal on a solid support comprising the steps of:
   treating said surface of said support with a first solvent, said first solvent being a solvent for said substrate;
   forming a powder slurry including fine semiconductor particles in a second solvent;
   applying said slurry to said surface of said support to form a semiconductor layer on said surface;
   drying said semiconductor layer on said surface of said support at room temperature to remove said second solvent to achieve bonding between said semiconductor layer and said surface of said support;
   placing a solution of a compound of said noble metal on said semiconductor layer to form a noble metal compound layer;
   irradiating said noble metal compound layer with light energy, and
   washing said noble metal compound layer with water.

* * * * *